(12) United States Patent
Huffer (10) Patent No.: US 11,851,253 B2
(45) Date of Patent: *Dec. 26, 2023

(54) TAMPER EVIDENT HYBRID RESEALABLE CONTAINER

(71) Applicant: Sonoco Development, Inc., Hartsville, SC (US)

(72) Inventor: Scott William Huffer, Hartsville, SC (US)

(73) Assignee: SONOCO DEVELOPMENT, INC., Hartsville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/105,023

(22) Filed: Feb. 2, 2023

(65) Prior Publication Data
US 2023/0174269 A1 Jun. 8, 2023

Related U.S. Application Data

(63) Continuation of application No. 17/470,022, filed on Sep. 9, 2021, now Pat. No. 11,597,559, which is a
(Continued)

(51) Int. Cl.
*B65D 5/54* (2006.01)
*B65D 5/42* (2006.01)
(Continued)

(52) U.S. Cl.
CPC ........ *B65D 5/5425* (2013.01); *B23K 26/0846* (2013.01); *B23K 26/364* (2015.10);
(Continued)

(58) Field of Classification Search
CPC ...... B65D 5/5425; B65D 5/02; B65D 5/4266; B65D 5/563; B65D 75/5838;
(Continued)

(56) References Cited

U.S. PATENT DOCUMENTS 1,827,636 A 10/1931 Ames
2,131,575 A 9/1938 Whipple
(Continued)

FOREIGN PATENT DOCUMENTS

CA 2918375 1/2015
CN 1558827 12/2004
(Continued)

OTHER PUBLICATIONS

"Tamper-evidence: Consumers have come to expect tamper-evidence for drugs, foods"; Packaging (Boston, Mass); Mar. 19, 1989; vol. 34, No. 5 (3 pgs.).
(Continued)

*Primary Examiner* — Christopher R Demeree
(74) *Attorney, Agent, or Firm* — Nelson Mullins Riley & Scarborough LLP (57) ABSTRACT

The present invention relates to a composite container comprising a bottom film layer and a top film layer at least partially adhered to the bottom film layer. The top film layer is scored to form at least one resealable flap and at least one pull tab which is not adhered to the bottom film layer. The bottom film layer comprises at least one cavity opening. A cardboard layer is adhered on its lower surface to the upper surface of the top film layer, wherein the cardboard layer has at least one cavity opening which is substantially aligned with the scoring of the top film layer resealable flap and the cardboard layer is perforated to define a perimeter of at least one pull tab which is substantially aligned with and adhered, on its underside, to the upper surface of the top film layer pull tab.

19 Claims, 8 Drawing Sheets

Related U.S. Application Data continuation of application No. 16/872,839, filed on May 12, 2020, now Pat. No. 11,148,851, which is a continuation of application No. 16/386,688, filed on Apr. 17, 2019, now Pat. No. 10,689,151, which is a continuation of application No. 15/656,481, filed on Jul. 21, 2017, now Pat. No. 10,351,294.

(51) Int. Cl.

| | | |
|---|---|---|
| *B65D 5/56* | (2006.01) | |
| *B65D 5/02* | (2006.01) | |
| *B23K 26/402* | (2014.01) | |
| *B32B 7/14* | (2006.01) | |
| *B32B 27/10* | (2006.01) | |
| *B32B 37/12* | (2006.01) | |
| *B32B 37/18* | (2006.01) | |
| *B32B 38/00* | (2006.01) | |
| *B23K 26/08* | (2014.01) | |
| *B23K 26/364* | (2014.01) | |
| *B23K 103/16* | (2006.01) | |
| *B23K 101/16* | (2006.01) | |
| *B23K 101/34* | (2006.01) | |
| *B23K 103/00* | (2006.01) | |
| *B31B 50/00* | (2017.01) | |
| *B31B 50/83* | (2017.01) | |
| *B31B 105/00* | (2017.01) | |
| *B31B 120/10* | (2017.01) | |
| *B31B 50/25* | (2017.01) | |
| *B31B 50/62* | (2017.01) | |
| *B31B 50/14* | (2017.01) | |
| *B31B 110/35* | (2017.01) | |

(52) U.S. Cl.
CPC ............ *B23K 26/402* (2013.01); *B31B 50/00* (2017.08); *B32B 7/14* (2013.01); *B32B 27/10* (2013.01); *B32B 37/1292* (2013.01); *B32B 37/182* (2013.01); *B32B 38/0004* (2013.01); *B65D 5/02* (2013.01); *B65D 5/4266* (2013.01); *B65D 5/5455* (2013.01); *B65D 5/563* (2013.01); *B23K 2101/16* (2018.08); *B23K 2101/34* (2018.08); *B23K 2103/172* (2018.08); *B23K 2103/42* (2018.08); *B31B 50/14* (2017.08); *B31B 50/25* (2017.08); *B31B 50/624* (2017.08); *B31B 2105/001* (2017.08); *B31B 2110/35* (2017.08); *B31B 2120/102* (2017.08); *B32B 2439/62* (2013.01)

(58) Field of Classification Search
CPC .......... B65D 2575/586; B65D 77/2056; B65D 2575/368; B65D 33/20; B31B 50/83; B23K 26/402; B32B 7/14; B32B 27/10; B32B 37/182; B32B 38/004; B32B 2307/748; B32B 2553/00; B32B 2439/70
USPC ......... 229/212, 232, 123.3, 206, 87.08, 903, 229/905, 117.25, 125.35, 162.7, 245, 247, 229/80.5, 906; 206/769; D9/416; 220/359.3, 270, 259.3, 359.2, 269; 428/35.9, 41.8, 42.3
See application file for complete search history.

(56) References Cited

U.S. PATENT DOCUMENTS

| | | | |
|---|---|---|---|
| 2,861,735 A | 11/1958 | Faltin | |
| 2,952,395 A | 9/1960 | Spees | |
| 2,973,086 A | 2/1961 | Thompson | |
| 2,991,001 A | 7/1961 | Hughes | |
| 3,127,087 A | 3/1964 | Spees | |
| 3,144,191 A | 8/1964 | Saidel | |
| 3,167,238 A | 1/1965 | Smith | |
| 3,239,097 A | 3/1966 | Bates et al. | |
| 3,259,303 A | 7/1966 | Repko | |
| 3,266,965 A | 8/1966 | Spees | |
| 3,279,331 A | 10/1966 | Platt | |
| 3,335,939 A | 8/1967 | Robinson, Jr. | |
| 3,399,820 A | 9/1968 | Foster | |
| 3,942,640 A | 3/1976 | Hellstrom | |
| 3,946,872 A | 3/1976 | Sturm | |
| 4,023,292 A | 5/1977 | Shibata et al. | |
| 4,066,600 A | 1/1978 | Pletcher et al. | |
| 4,185,754 A | 1/1980 | Julius | |
| 4,260,061 A * | 4/1981 | Jacobs ................... | B65D 31/04 383/203 |
| 4,264,662 A | 4/1981 | Taylor et al. | |
| 4,280,653 A | 7/1981 | Elias | |
| 4,345,393 A | 8/1982 | Price et al. | |
| 4,353,460 A | 10/1982 | Kahn | |
| 4,372,460 A | 2/1983 | Brochman et al. | |
| 4,381,848 A | 5/1983 | Kahn | |
| 4,452,842 A | 6/1984 | Borges et al. | |
| 4,464,158 A | 8/1984 | Kardon | |
| 4,502,599 A | 3/1985 | Perecman | |
| 4,531,668 A | 7/1985 | Forbes, Jr. | |
| 4,574,952 A | 3/1986 | Masui | |
| 4,577,762 A | 3/1986 | Kuchenbecker | |
| 4,584,201 A | 4/1986 | Boston | |
| 4,679,693 A | 7/1987 | Forman | |
| 4,687,104 A * | 8/1987 | Ielmini ................... | B65D 5/545 229/188 |
| 4,738,365 A | 4/1988 | Prater | |
| 4,785,940 A | 11/1988 | Wilson | |
| 4,838,429 A | 6/1989 | Fabisiewicz et al. | |
| 4,846,504 A | 7/1989 | MacGregor et al. | |
| 4,871,265 A | 10/1989 | Peck | |
| 4,913,560 A | 4/1990 | Herrington | |
| 5,044,776 A | 9/1991 | Schramer et al. | |
| 5,123,535 A | 6/1992 | Patnode et al. | |
| 5,265,794 A | 11/1993 | Johnston | |
| 5,415,910 A | 5/1995 | Knauf | |
| 5,484,167 A | 1/1996 | Donaldson et al. | |
| 5,507,428 A | 4/1996 | Robinson, Jr. et al. | |
| 5,569,515 A | 10/1996 | Rice, II et al. | |
| 5,571,358 A | 11/1996 | Napier et al. | |
| 5,832,145 A | 11/1998 | Dais et al. | |
| 5,833,368 A | 11/1998 | Kaufman | |
| 5,855,435 A | 1/1999 | Chiesa | |
| 5,871,096 A | 2/1999 | Yakich | |
| 5,902,045 A | 5/1999 | Resteghini | |
| 5,910,348 A | 6/1999 | Hart-Smith et al. | |
| 5,947,368 A | 9/1999 | Thresher et al. | |
| 5,958,486 A | 9/1999 | Ringdahl et al. | |
| 5,979,748 A | 11/1999 | Drummond et al. | |
| 5,996,797 A | 12/1999 | Flaig | |
| 6,026,953 A | 2/2000 | Nakamura et al. | |
| 6,041,929 A | 3/2000 | Brunner et al. | |
| 6,047,488 A | 4/2000 | Tuskiewicz | |
| 6,056,141 A | 5/2000 | Navarini et al. | |
| 6,190,485 B1 | 2/2001 | Cahill et al. | |
| 6,196,450 B1 | 3/2001 | Varadarajan et al. | |
| 6,206,570 B1 | 3/2001 | Cortopassi | |
| 6,234,386 B1 | 5/2001 | Drummond et al. | |
| 6,264,098 B1 | 7/2001 | Drummond et al. | |
| 6,270,004 B1 | 8/2001 | Drummond et al. | |
| 6,302,321 B1 | 10/2001 | Reese et al. | |
| 6,328,203 B1 | 12/2001 | Tedford, Jr. | |
| 6,334,711 B1 | 1/2002 | Risgalla et al. | |
| 6,383,592 B1 | 5/2002 | Lowry et al. | |
| 6,428,867 B1 | 8/2002 | Scott et al. | |
| 6,460,720 B1 | 10/2002 | Massey et al. | |
| 6,497,336 B2 | 12/2002 | Grayer | |
| 6,544,613 B1 | 4/2003 | Varadarajan | |
| 6,589,622 B1 | 7/2003 | Scott | |
| 6,620,275 B1 | 9/2003 | Avila et al. | |
| 6,660,353 B2 | 12/2003 | Siedl | |
| 6,746,743 B2 | 1/2004 | Knoerzer et al. | |
| 6,857,561 B2 | 2/2005 | Williams et al. | |

(56) References Cited

U.S. PATENT DOCUMENTS

| | | |
|---|---|---|
| 6,858,108 B2 | 2/2005 | Matthews et al. |
| 6,890,112 B2 | 5/2005 | Kline |
| 6,991,375 B2 | 1/2006 | Clune et al. |
| 7,144,635 B2 | 12/2006 | Hawes et al. |
| 7,189,300 B2 | 3/2007 | Knoerzer et al. |
| 7,228,961 B2 | 6/2007 | Koetter et al. |
| 7,344,744 B2 | 3/2008 | Sierra-Gomez et al. |
| 7,416,768 B2 | 8/2008 | Knoerzer et al. |
| 7,422,782 B2 | 9/2008 | Haedt et al. |
| 7,608,317 B2 | 10/2009 | Keckeisen et al. |
| 7,686,513 B2 | 3/2010 | Knoerzer et al. |
| 7,717,620 B2 | 5/2010 | Hebert et al. |
| 7,789,236 B2 | 9/2010 | Burgess |
| 7,828,923 B2 | 11/2010 | Patel |
| 7,955,678 B2 | 6/2011 | Stogbauer et al. |
| 8,051,979 B2 | 11/2011 | Smith et al. |
| 8,408,451 B2 | 4/2013 | Adam et al. |
| 8,443,578 B2 | 5/2013 | Sargin et al. |
| 8,544,718 B2 | 10/2013 | Yamato et al. |
| 8,646,975 B2 | 2/2014 | Moehlenbrock et al. |
| 8,740,052 B2 | 6/2014 | Drummond |
| 8,746,490 B2 | 6/2014 | Huffer et al. |
| 9,096,346 B2 | 8/2015 | Huffer |
| D747,202 S | 1/2016 | Sanfilippo et al. |
| 9,278,506 B2 | 3/2016 | McLean |
| 9,850,056 B2 | 12/2017 | Shaw et al. |
| 9,944,446 B2 | 4/2018 | Huffer et al. |
| 2003/0178429 A1 | 9/2003 | Williams et al. |
| 2004/0013827 A1 | 1/2004 | Zuser et al. |
| 2004/0064983 A1 | 4/2004 | Joseph |
| 2004/0079763 A1 | 4/2004 | Powell et al. |
| 2005/0031814 A1 | 2/2005 | Dawes |
| 2005/0078890 A1 | 4/2005 | Abe et al. |
| 2005/0109652 A1 | 5/2005 | Goepfert |
| 2005/0153113 A1 | 7/2005 | Hseih et al. |
| 2005/0247764 A1 | 11/2005 | Sierra-Gomez et al. |
| 2005/0276525 A1 | 12/2005 | Hebert et al. |
| 2006/0138207 A1 | 6/2006 | Levine et al. |
| 2006/0147129 A1 | 7/2006 | Miller |
| 2006/0198986 A1 | 9/2006 | Keckeisen et al. |
| 2007/0051790 A1 | 3/2007 | Smith et al. |
| 2008/0037911 A1 | 2/2008 | Cole et al. |
| 2008/0044114 A1 | 2/2008 | Hall et al. |
| 2008/0073308 A1 | 3/2008 | Yousif |
| 2008/0240627 A1 | 10/2008 | Cole et al. |
| 2008/0272016 A1 | 11/2008 | Anderson et al. |
| 2009/0194451 A1 | 8/2009 | Leiner et al. |
| 2009/0226117 A1 | 9/2009 | Davis et al. |
| 2009/0274799 A1 | 11/2009 | Lee et al. |
| 2010/0098355 A1 | 4/2010 | Jansen |
| 2010/0111453 A1 | 5/2010 | Dierl |
| 2010/0147724 A1 | 6/2010 | Mitra-Shah et al. |
| 2010/0288760 A1 | 11/2010 | McGrew et al. |
| 2011/0038569 A1 | 2/2011 | Huffer et al. |
| 2011/0049168 A1 | 3/2011 | Loftin |
| 2011/0089177 A1 | 4/2011 | Thorstensen-Wolf |
| 2011/0204056 A1 | 8/2011 | Veternik et al. |
| 2012/0082764 A1 | 4/2012 | Paterson |
| 2012/0125932 A1 | 5/2012 | Sierra-Gomez et al. |
| 2012/0177307 A1 | 7/2012 | Duan et al. |
| 2012/0314979 A1 | 12/2012 | Heininga |
| 2013/0011527 A1 | 1/2013 | Renders et al. |
| 2013/0026170 A1 | 1/2013 | Zerfas et al. |
| 2013/0056469 A1 | 3/2013 | Davis et al. |
| 2013/0089280 A1 | 4/2013 | Tseng et al. |
| 2013/0101239 A1 | 4/2013 | Kropf et al. |
| 2013/0114918 A1 | 5/2013 | Lyzenga et al. |
| 2013/0121624 A1 | 5/2013 | Lyzenga et al. |
| 2013/0279832 A1 | 10/2013 | Burri et al. |
| 2013/0320019 A1 | 12/2013 | Tinoco et al. |
| 2014/0000219 A1 | 1/2014 | Pezzoli |
| 2014/0079343 A1 | 3/2014 | Lyzenga et al. |
| 2014/0270597 A1 | 9/2014 | Friedman et al. |
| 2014/0363545 A1 | 12/2014 | Veternik et al. |
| 2014/0376836 A1 | 12/2014 | Schieber |
| 2015/0158643 A1 | 6/2015 | Coker et al. |
| 2015/0297005 A1 | 10/2015 | Janor |
| 2015/0353238 A1 | 12/2015 | Moehlenbrock et al. |
| 2016/0009447 A1 | 1/2016 | Rhue |
| 2016/0096667 A1 | 4/2016 | Huffer |
| 2016/0130041 A1 | 5/2016 | Giorgio et al. |
| 2016/0167680 A1 | 7/2016 | Tomsovic et al. |
| 2016/0227835 A1 | 8/2016 | Swede |
| 2016/0236844 A1 | 8/2016 | Gagne et al. |
| 2016/0288960 A1 | 10/2016 | Branyon |
| 2016/0343275 A1 | 11/2016 | Huffer et al. |
| 2017/0121086 A1 | 5/2017 | Hartley |
| 2017/0121088 A1 | 5/2017 | Rhue |
| 2017/0283149 A1 | 10/2017 | Rhue |
| 2017/0341852 A1* | 11/2017 | Bray ................. B65D 85/1045 |
| 2017/0345344 A1 | 11/2017 | Huffer et al. |
| 2018/0071974 A1* | 3/2018 | Huffer .................. B29C 59/007 |
| 2018/0244452 A1 | 8/2018 | Huffer |
| 2018/0293918 A1 | 10/2018 | Huffer et al. |
| 2019/0023452 A1 | 1/2019 | Huffer |

FOREIGN PATENT DOCUMENTS

| | | |
|---|---|---|
| DE | 8903067 | 7/1989 |
| EP | 0 488 967 | 6/1992 |
| EP | 0499647 B1 | 1/1995 |
| EP | 0952087 A2 | 10/1999 |
| EP | 1080874 | 3/2001 |
| EP | 1477408 A1 | 11/2004 |
| EP | 1770025 A2 | 4/2009 |
| FR | 1514374 A | 2/1968 |
| FR | 2 463 468 A1 | 2/1981 |
| GB | 2147564 A | 5/1985 |
| GB | 2491646 A | 12/2012 |
| JP | 2000 203654 A | 7/2000 |
| JP | 2013 147269 A | 8/2013 |
| WO | WO 95/29097 A1 | 11/1995 |
| WO | WO 96/25333 A1 | 8/1996 |
| WO | WO 98/28728 A1 | 7/1998 |
| WO | WO 03/062090 A1 | 7/2003 |
| WO | WO 2006/093898 A1 | 9/2006 |
| WO | WO 2006/132761 A2 | 12/2006 |
| WO | WO 2008/086389 A2 | 7/2008 |
| WO | WO 2011/158014 A1 | 12/2011 |
| WO | WO 2012/036765 A1 | 3/2012 |
| WO | WO 2014/186571 A2 | 11/2014 |
| WO | WO 2015/009658 A2 | 1/2015 |

OTHER PUBLICATIONS

"Innovations for opening and closing"; Food Trade Review; Oct. 1993; vol. 63, No. 4 (3 pgs.).

Kate Bertrand; "Improve security through packaging: emerging technologies can help create a package that safeguards products from tampering and protects your brand from counterfeiting"; Food Processing; Feb. 2006; vol. 67, No. 2 (5 pgs.).

LPS Industries, Loc n Press Pressure Sensitive Zippered Envelopes, www.lpsind.com, accessed Apr. 1, 2015.

ITC, Custom Adhesive Tape Manufacturing & Design, www.itctapes.com, accessed Feb. 2, 2015.

Clearbags, Value Crystal Clear Bags, www.clearbags.com, accessed Apr. 1, 2015.

Office Action for corresponding Canadian Patent Application No. 2,847,432 dated Nov. 25, 2014.

Final Office Action for U.S. Appl. No. 14/928,489 dated Mar. 22, 2018.

Non-Final Office Action for U.S. Appl. No. 14/676,390 dated Apr. 27, 2018.

Non-final Office Action for U.S. Appl. No. 14/871,398 dated May 2, 2018.

International Search Report and Written Opinion for International Application No. PCT/IB2015/057508 dated Nov. 19, 2015.

International Search Report and Written Opinion of the International Searching Authority for International Application No. PCT/US2017/064594 dated Mar. 27, 2018.

(56) References Cited

OTHER PUBLICATIONS

International Search Report and Written Opinion of the International Searching Authority for International Application No. PCT/US2018/054170 dated Dec. 6, 2018.
Extended European Search Report for Application No. 18174641.3 dated Sep. 10, 2018.
Substantive Examination Report for Malaysian Application No. PI 2015702224 dated Mar. 29, 2019.
Canadian Patent Application No. 3,006,160, filed May 25, 2018, Canadian Office Action dated Apr. 2, 2019.
European Examination Report for European Patent Application No. 18174601.7 dated Oct. 9, 2019.
U.S. Appl. No. 15/807,200, entitled "Membrane Lid With Integrated Peelable Portion," filed Nov. 8, 2017, Non-Final Office Action dated May 31, 2019.

* cited by examiner

TAMPER EVIDENT HYBRID RESEALABLE CONTAINER

CROSS-REFERENCE TO RELATED APPLICATIONS

This application is a continuation of U.S. patent application Ser. No. 17/470,022, filed Sep. 9, 2021 entitled "TAMPER EVIDENT HYBRID RESEALABLE CONTAINER", which is a continuation of U.S. patent application Ser. No. 16/872,839, filed May 12, 2020, issued as U.S. Pat. No. 11,148,851 entitled "TAMPER EVIDENT HYBRID RESEALABLE CONTAINER", which is a continuation of U.S. patent application Ser. No. 16/386,688, filed Apr. 17, 2019, issued as U.S. Pat. No. 10,689,151 entitled "TAMPER EVIDENT HYBRID RESEALABLE CONTAINER", which is a continuation of U.S. patent application Ser. No. 15/656,481, filed Jul. 21, 2017, issued as U.S. Pat. No. 10,351,294, entitled "Tamper Evident Resealable Containers", which is incorporated herein in its entirety.

FIELD OF THE INVENTION

The present invention relates generally to tamper evident resealable containers.

SUMMARY OF THE INVENTION

In an embodiment, the present invention relates to a composite container which has a bottom film layer and a top film layer at least partially adhered on its lower surface to the upper surface of the bottom film layer. The top film layer is scored to form at least one resealable flap and at least one pull tab continuous with the resealable flap, wherein the resealable flap is resealably adhered to the bottom film layer and the pull tab is not adhered to the bottom film layer. The bottom film layer comprises at least one cavity opening. A cardboard layer is adhered on its lower surface to the upper surface of the top film layer, wherein the cardboard layer has at least one cavity opening which is substantially aligned with the scoring of the top film layer resealable flap and the cardboard layer is perforated to form at least one pull tab which is substantially aligned with and adhered, on its underside, to the upper surface of the top film layer pull tab.

According to an aspect, the present invention provides a resealable container comprising a bottom film layer, a top film layer, and a cardboard layer set forth in at least one wall of the container. The top film layer is partially adhered on its lower surface to the upper surface of the bottom film layer via an adhesive layer which comprises at least one resealable adhesive zone, at least one permanent adhesive zone, and at least one adhesive-free zone. The top film layer is scored to form at least one resealable flap which is disposed partially within the at least one resealable adhesive zone and partially within the at least one adhesive-free zone. The top film layer is also scored to form at least one pull tab which is continuous with the resealable flap and is disposed within the at least one adhesive-free zone. The bottom film layer is scored to form at least one cavity opening, an edge of which is disposed substantially between the at least one resealable adhesive zone and the at least one adhesive-free zone. The cardboard layer is permanently adhered on its lower surface to the upper surface of the top film layer and has at least one cavity opening which is substantially aligned with the scoring of the top film layer resealable flap. The cardboard layer is additionally perforated to form at least one pull tab which is substantially aligned with and permanently adhered, on its underside, to the upper surface of the top film layer pull tab.

According to another aspect, the present invention also provides a method for making a resealable container comprising providing a bottom film layer, a top film layer, and a cardboard layer. The method then involves laminating the upper surface of the bottom film layer to the underside of the top film layer using a pressure sensitive adhesive and a permanent adhesive to form a laminated film, wherein the adhesives are pattern applied. The top film layer is then scored to form at least one resealable flap which is continuous with at least one film pull tab. The bottom film layer is then scored to form at least one film cavity opening. The cardboard layer is then cut to form at least one cardboard cavity opening. The cardboard layer is perforated to form at least one cardboard pull tab. The upper surface of the laminated film is adhered to the underside of the cardboard layer using a permanent adhesive, wherein the cardboard cavity opening is substantially aligned with the resealable flap scoring and the cardboard pull tab perforations are substantially aligned with the film pull tab scoring.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Repeat use of reference characters in the present specification and drawings is intended to represent the same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

A variety of food and non-food products are packaged using cardboard or paperboard containers. Folded cardboard containers or cartons are well known in the art to be used for this purpose. These containers are often opened by manually separating layers of cardboard that are glued or adhered together at a closure. Once the adhesive seal is broken and, in some embodiments, other seams are perforated (for example, along the sidewall of the container), the container contents can be accessed. However, the typical container cannot be resealed in a manner that effectively preserves the freshness of the container contents. For example, if a cardboard flap is merely fitted within a cardboard slot in order to reclose a container, the unused products within the container may be susceptible to being adversely affected by exposure to the surrounding environment (e.g., becoming soggy, drying out, etc.). Accordingly, there is a desire to be able to reclose a cardboard folded container after its initial opening to keep the product that remains in the package fresh. In addition, in an embodiment, such container also comprises tamper evidence features which allow a consumer to readily determine whether a container has already been opened.

In an embodiment, the present invention comprises a folded cardboard or paperboard container which has a film window that allows consumers to access the contents of the container therethrough. The film window may be clear, allowing the consumer to view the contents of the container. Such a window not only provides the consumer with the ability to compare the appearance of competing products, but also provides the consumer with confidence that the product does not have any defects, such as food spoilage in the case of food products, prior to making a purchase.

In this embodiment, the container is opened via the film window, which avoids any interference with the structural integrity of the cardboard container. No perforation or separation of sidewalls, or the like, is necessary. The container is additionally resealable via the film layer, allowing the consumer to open the container, remove the desired contents from the container, and then reseal the film layer to the container through the use of a pressure sensitive adhesive. The container can thus be repeatedly opened and resealed. Finally, in some embodiments, the container has a tamper evidence feature comprising the cardboard layer, which allows a consumer to more readily determine, by visual inspection, whether the container has been opened. Because the tamper evidence feature is presented in the cardboard layer rather than the film layer, use of the tamper evidence feature of the container additionally avoids otherwise common tearing issues within the film layer.

The container of the present invention can be used in connection with the packaging of food and non-food products. In various examples, the inventive container may be used to store cookies, crackers, doughnuts, cakes, pies, or any other products which may be opened and resealed, and would be susceptible to being adversely affected by exposure to the surrounding environment.

The container of the present invention may comprise a reclosable folding box, container, or carton of sheet material having an interior and an exterior with at least one tamper evidence feature. The container may be produced from any suitable material, including paperboard, cardboard, or the like, cut and/or punched out as appropriate, and provided with appropriate folding lines, scoring lines, and/or predetermined break lines. The container material may comprise any thickness known in the art. Though the container set forth in the drawings is illustrated as a rectangular box, the container is not limited to any shape or configuration. The container of the invention may comprise any design, shape or configuration known in the art, including but not limited to square, rectangular, trapezoidal, or any other shape. Certain walls or features of the container may be folded, scored, broken, and/or inserted or adhered together, as appropriate, in order to form the basic container shape.

Figure 1:
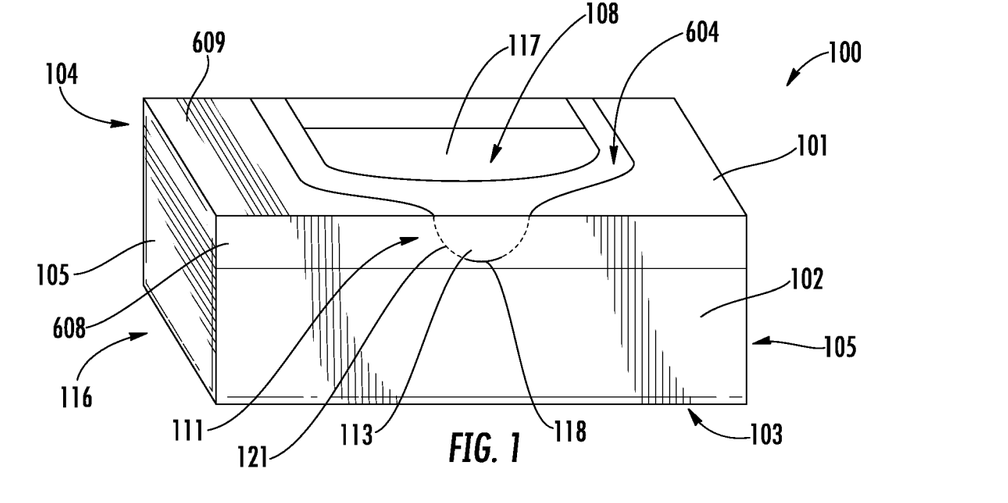
FIG. 1 is a perspective view of an embodiment of a container of the present invention in a closed configuration.

Turning to the drawings, FIG. 1 illustrates a perspective view of an embodiment of a container of the present invention. As set forth in FIG. 1, in an embodiment, the container 100 comprises a body 116 which has a top wall 101, a front wall 102, a bottom wall 103, a back wall 104, and two side walls 105. The container walls (101, 102, 103, 104, and 105) define an interior portion of the container which is designed to hold the contents of the container (i.e. doughnuts or cookies). The container additionally comprises an opening 106 which leads to the container cavity 115. In some embodiments, the container opening 106 is defined in only the top wall 101 of the container. However, the container opening 106 could alternatively be defined in one or more other container walls. For example, the container opening 106 could be defined in the top wall 101 of the container, but may also extend partially into the front wall 102 of the container. Similarly, the container opening 106 is shown in the drawings as extending completely to the rear edge of the top wall 101, but could end before the rear edge. The container opening 106 is shown as extending near, but not fully to the front edge of top wall 101, but again, could extend fully to the front edge of top wall 101 or could even extend partially into front wall 102.

The container 100 additionally comprises a film layer 108. The film layer 108 may comprise a multilayer flexible film. For example, the film layer 108 may comprise a top layer flexible film 109 and a bottom layer flexible film 110 (shown in FIG. 2). The film utilized herein may comprise any flexible packaging film known in the art, including but not limited to, polymer films, metalized polymer films, papers, metal foils, polyester films, polyolefin films, polyethylene terephthalate (PET) polypropylene (OPP), metalized polyester (MPET), any combination thereof, or any other suitable film known in the art. In an embodiment, the film 108 may comprise a pre-printed film or label.

In certain embodiments, the film 108 of the invention may additionally comprise a barrier layer, providing a barrier against the passage of oxygen, other gases, and/or moisture. In some embodiments, the barrier may prevent wicking or leakage of a food product into and through the container walls. In other embodiments, the film 108 may additionally comprise one or more metallization layers or foil layers, which may be helpful in preventing a laser or die cutting machine from penetrating through the entire thickness of the top film 109 and/or the bottom film 110.

In the embodiment wherein the film layer 108 comprises a two layer film, the bottom side of the top layer flexible film 109 and the top side of the bottom layer flexible film 110 may be permanently affixed, in some areas, and may be releasably affixed, in areas, through use of appropriate adhesives. In locations wherein the film layers 109 and 110 should be releasably affixed, the adhesive may comprise a pressure sensitive adhesive ("PSA"). Any suitable PSA known in the art may be utilized in the present invention. For example, the PSA may comprise an acrylic, a natural rubber, a synthetic rubber, a silicone, a butyl, or an ethylenevinylacetate ("EVA"). The PSA should be selected such that it releasably secures the top film 109 to the bottom film 110. The PSA utilized should allow the top film 109 and the bottom film 110 to be separated and resealed multiple times by the end user. Optionally, more than one PSA may be utilized, wherein the PSAs allow the bonding of the top film 109 to the bottom film 110 at different levels of affinity.

In locations wherein the film layers 109 and 110 should be permanently affixed, the adhesive may comprise any permanent adhesive known in the art. The permanent adhesive should be selected such that it permanently adheres the top film 109 to the bottom film 110 (or any two relevant surfaces), without damaging the relevant films/surfaces or the adhesive, particularly during the opening and reclosing of the container. Optionally, more than one permanent adhesive may be utilized, wherein the permanent adhesives allow the bonding of the top film 109 to the bottom film 110 at different levels of affinity.

In an embodiment, the multi-ply film 108 of the invention may have permanent adhesive zone and a PSA zone. For example, as shown in FIGS. 6B and 6C, the bottom film 110 may have a permanent adhesive zone 601 and a PSA zone 602. Similarly, the top film 109 may have a permanent adhesive zone 603 and a PSA zone 604. The bottom film 110 may be coated, on its top side, with a permanent adhesive in the permanent adhesive zone 601. Alternatively, or in addition to the adhesive layer applied to the bottom film 110, the top film 109 may be coated, on its bottom side, with a permanent adhesive in the permanent adhesive zone 603. The top film 109 may also be coated, on its bottom side, with a PSA in the PSA zone 604. The top film 109 may be applied to the bottom film 110 such that the permanent adhesive zone 601 of the bottom film 110 is in registry with the permanent adhesive zone 603 of the top film 109. Similarly, the PSA zone 602 of the bottom film 110 should be in registry with the PSA zone 604 of the top film 109.

In addition, the top film 109 and the bottom film 110 may each contain an adhesive-free zone 112 (see FIG. 6C). That is, when the top film 109 is applied to the bottom film 110, there is no adhesive between the two layers in the adhesive-free zone 112. The adhesive-free zone 112 may be disposed in the location of a top film 109 pull tab 111. In an embodiment, the adhesives may be pattern applied to create the adhesive-free zone, wherein no adhesive is applied. In other embodiments, the entire surface of one or more of the top film 109 or the bottom film 110 may be coated with one or more adhesives and the relevant adhesives may be deadened to create the adhesive-free zone.

In an embodiment, the permanent adhesive and the PSA are applied to the top film 109 and/or bottom film 110 in a pattern. In this embodiment, the adhesive free-zone 112 may be avoided or deadened after application of adhesive. In another embodiment, the top film 109 or bottom film 110 may be flooded with PSA, optionally with the exception of the adhesive-free zone 112. Alternatively, the adhesive free-zone 112 may be deadened after application of PSA. In this embodiment, the die cut pattern in the top film will allow the layers to separate at the resealable flap 114 without separating in zone 603. In this embodiment, no permanent adhesive is utilized. In another embodiment, the top film 109 (bottom surface) or bottom film 110 (top surface) may be flooded with permanent adhesive. After the permanent adhesive dries, zone 604 may be coated with PSA. The adhesive free-zone 112 may be avoided or deadened after application of the permanent adhesive. The layers may then be sealed together.

The film pull tab 111 may be continuous with the top film 109. More particularly, the pull tab 111 may be continuous with a resealable flap 114 formed in the top film 109. The top film 109 may be scored at the overcut 606, optionally from top to bottom, to create a flap that covers container opening 106 and cavity 115 in the container body 116. The pull tab 111 and the resealable flap 114 may be configured in any shape or size known in the art. In an embodiment, the pull tab 111 may be semi-circular or semi-elliptical in shape.

In this embodiment, the end user can lift the pull tab 111, which may be located in the adhesive-free zone 112. In an embodiment, the pull tab 111 is not adhered to the container. In another embodiment, the pull tab 111 is lightly adhered or releasably adhered to the container. In any of these embodiments, the end user may lift the pull tab 111, which thereby separates and lifts the resealable flap 114 of the top film 109 away from the PSA zone 602 of the bottom film 110. The user may then remove any desired contents from the container 100, and then press the resealable flap 114 back onto the PSA zone 602 of the bottom film 110 to re-adhere the flap 114 to the container, thereby resealing the container 100. The container 100 can thus be repeatedly opened and resealed. In an embodiment, the PSA is present on the PSA zone 604 of the top film 109 (bottom surface), but not on the PSA zone 602 of the bottom film 110 (top surface).

In an embodiment, the resealable flap 114 may comprise a product viewing window 117, optionally located on the interior of the PSA zone 604. The product viewing window 117 may be transparent, translucent, or opaque. The product viewing 117 area may comprise a label, printed graphics, logos, or the like, related to the products contained therein. Similarly, in an embodiment, the exterior of the cardboard layer 613 may comprise a label, printed graphics, logos, or the like, related to the products contained therein. In a particular embodiment, any label, printing, or the like on the film 108 or resealable flap 114 may be blended or be continuous with a label, graphics, or other printing located on the exterior of the cardboard layer 613.

In an embodiment, the laminated film 108 is adhered within the interior of the cardboard container. In this embodiment, the laminated film 108 may receive an adhesive on the top side of the top film 109 within a front seal zone 608 and a rear seal zone 607. While front and rear seal zones are shown in the drawings, it should be understood that the film 108 can be sealed within the container 100 in any area known in the art. In an embodiment, the film 108 may extend and be sealed along the full length of the front wall 102 and/or the rear wall 104. In another embodiment, the film 108 may completely cover the entire interior of the container 100, and may provide improved barrier properties to the container as a result.

In one embodiment, the front seal zone 608 may extend the length of the laminated film 108 and/or the length of the top wall 101 or the front wall 102 of the container 100. The front seal zone 608 may be located along the top edge of the front wall 102 of the container or along the front edge of the top wall 101 of the container. The rear seal zone 607 may also extend the length of the laminated film 108 and/or the length of the top wall 101 or the front wall 102 of the container 100. The rear seal zone 607 may be located along the top edge of the rear wall 104 of the container or along the rear edge of the top wall 101 of the container. Similarly, in an embodiment, the laminated film 108 may be sealed to the container 100 at the top of the side walls 105 or the sides of the top wall 101. In any embodiment, the laminated film 108 may be hermetically sealed within the container 100. In an embodiment, the laminated film 108 is sealed within the interior of the container.

The hermetic seal described herein may be advantageous over designs that have different entry points into the container. For example, in an embodiment wherein the entry point into the inventive container is through the flexible resealable window in the top wall, the front, back, and/or side walls are not involved in container entry. Thus, the front and/or back walls, for example, can be sealed permanently to the top wall, with the laminated film in place. More aggressive adhesives can be used than would be available if the laminated film did not extend into the front and/or back walls. This type of aggressive adhesive use may not be available to use in a container that opens through the front wall. Particular carton geometries that would be unavailable in front-entry containers, for example, may be used in the present invention. In addition, the resulting container may have an improved barrier to the environment due to the expanse of the laminated film.

Figure 6A:
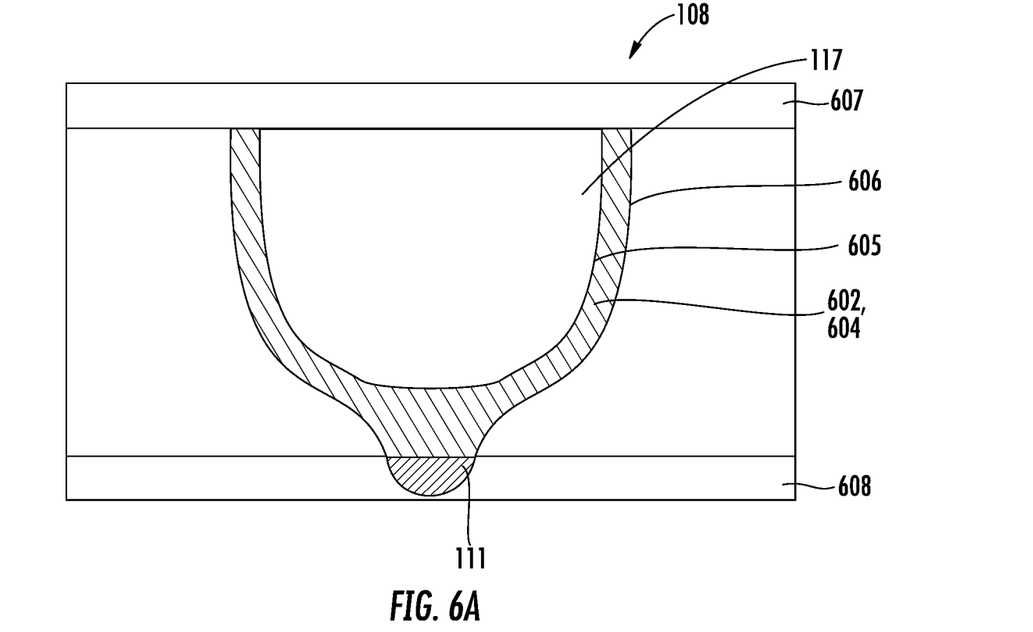
FIG. 6A is a top view of an embodiment of the film of the present invention.
Figure 6B:
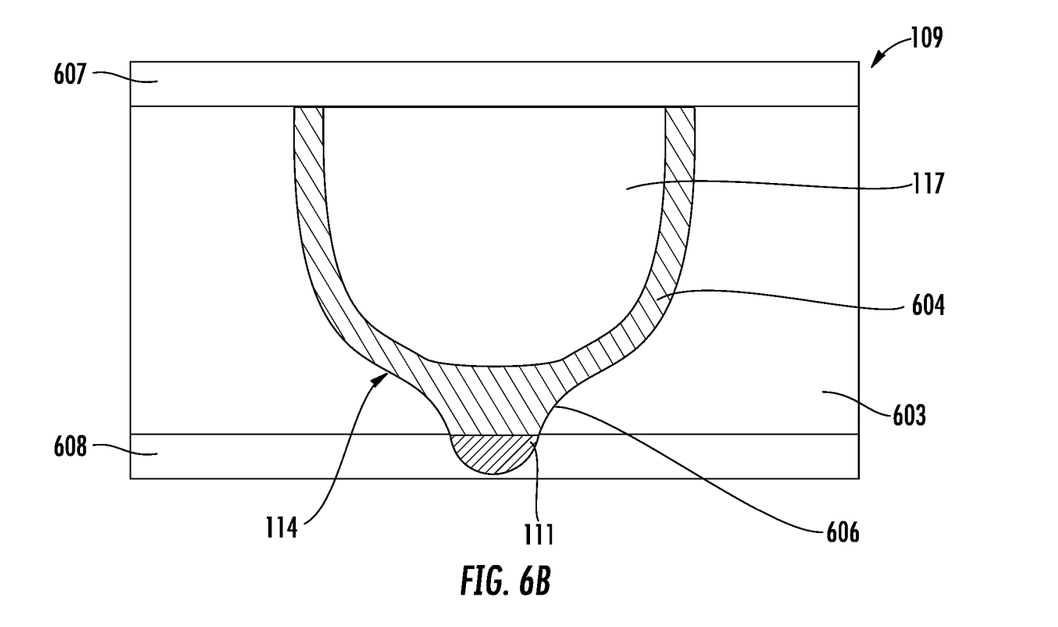
FIG. 6B is a top view of an embodiment of the top layer flexible film of the present invention.
Figure 6C:
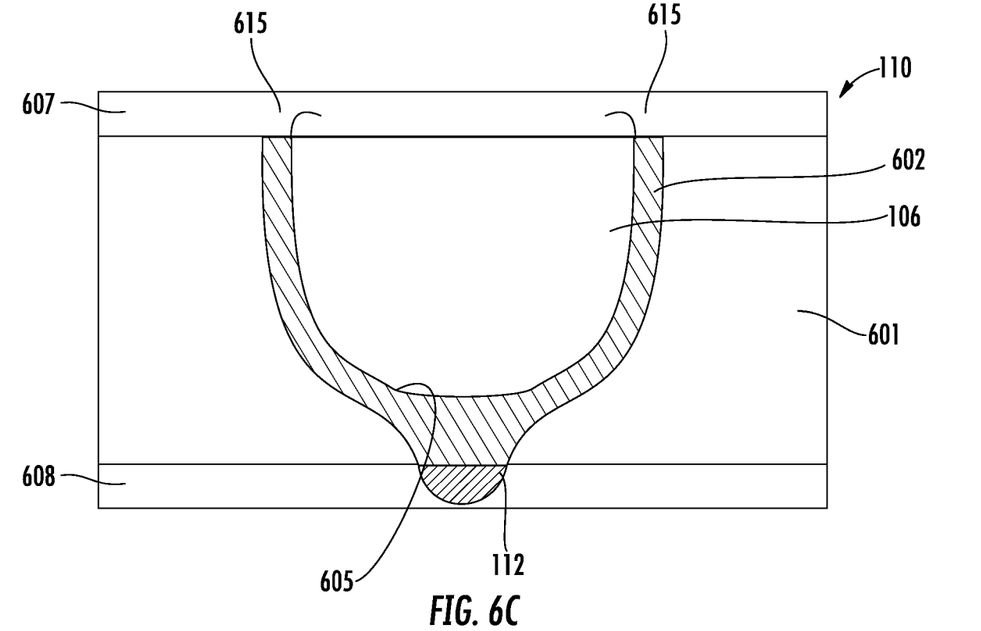
FIG. 6C is a top view of an embodiment of the bottom layer rigid film of the present invention.
Figure 6D:
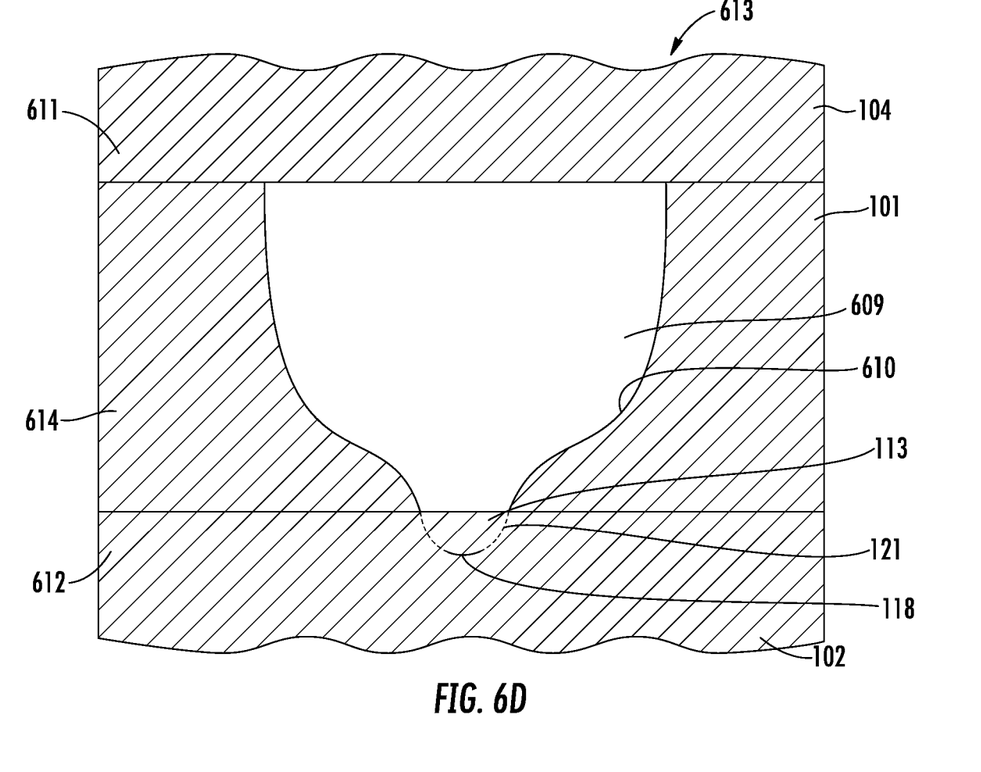
FIG. 6D is a top view of an embodiment of the cardboard layer of the present invention.
Figure 6E:
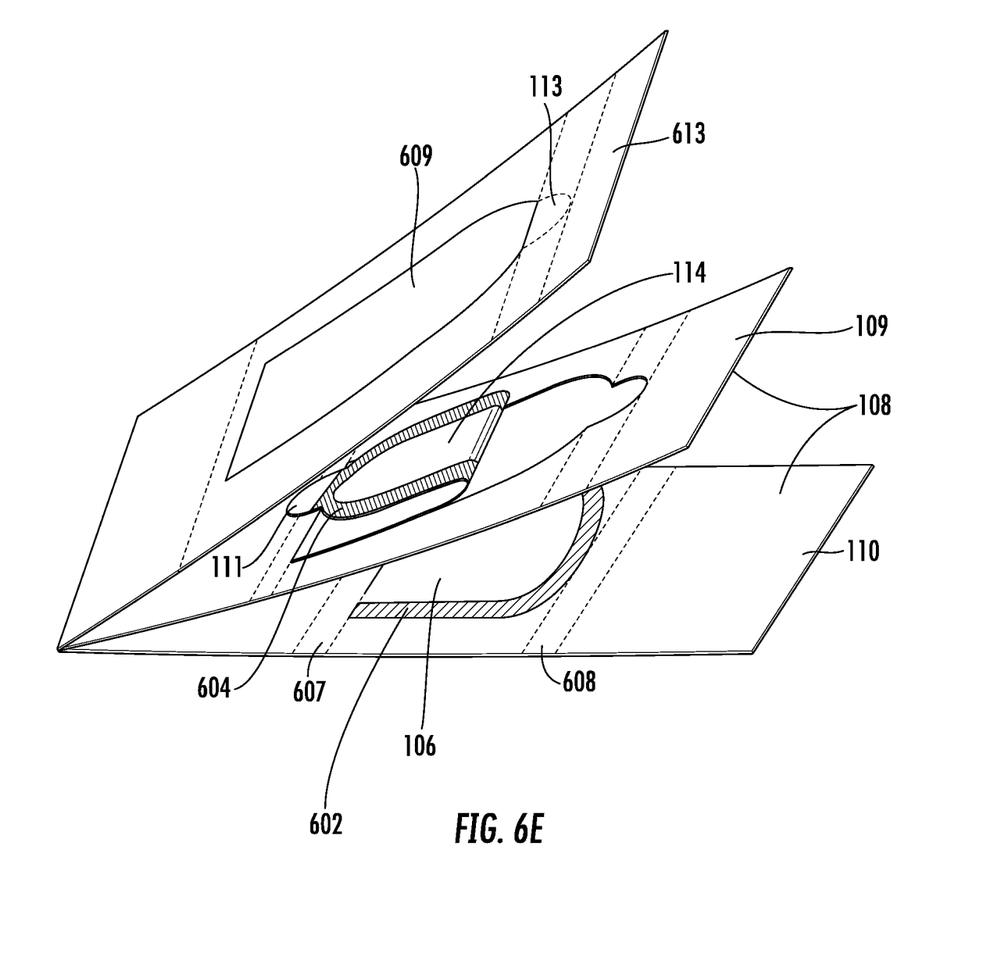
FIG. 6E is a perspective view of an embodiment of the multi-layer resealable container of the present invention.

Turning to FIG. 6D, in an embodiment, the container top wall 101 contains a cardboard opening 609 defined by an edge 610. The cardboard opening 609 and edge 610 may be created by laser cutting or die cutting the cardboard material, or by any other method known in the art. In an embodiment, the edge 610 is similarly sized, shaped, and oriented to that of the overcut 606 of the top film 109.

In an embodiment, the laminated film 108 shown in FIG. 6A is registered with the cardboard layer 613 shown in FIG. 6D. In an embodiment, the edge 610 is in registration with the overcut 606 of the top film 109. Thus, when the container is opened via the resealable flap 114, the PSA zone 602 of the bottom film 110 extends beyond the edge of the edge 610, into the interior of the opening 106. The PSA zones 602, 604 should be sized such that the PSA zone 604 of the resealable flap 114 can comfortably be replaced onto the PSA zone 602 of the bottom film 110 to reseal the package, but should not be so large as to impede access to the contents of the container 100 through the opening 609. In an embodiment, the width of the PSA zones 602, 604 may be roughly equivalent. In a particular embodiment, the width of the PSA zones 602, 604 may be less than about 2 inches. In another embodiment, the width of the PSA zone 602, 604 may be less than about 1 inch. In still another embodiment, the width of the PSA zone 602, 604 may be approximately 1 inch.

As noted above, the cardboard opening 609 may be disposed such that it extends near or to the rear edge 611 of the top wall 101. In a folded container, the rear edge 611 may comprise the fold of the box between the top wall 101 and the rear wall 104. Similarly, the cardboard opening 609 may be disposed such that it also (or alternatively) extends near or to the front edge 612 of the top wall 101. In a folded container, the front edge 612 may comprise the fold of the box between the top wall 101 and the front wall 102.

In an embodiment, a cardboard pull tab 113 is disposed adjacent the cardboard opening 609. The cardboard pull tab 113 may be disposed adjacent any edge or side of the cardboard opening 609. The cardboard pull tab 113, in an embodiment, has perforations 121 along at least some edges. In an embodiment, the cardboard pull tab 113 may be disposed along a two-ply container wall, in which case it may be necessary to have perforations along the pull tab 113 edge which is continuous with the two-ply wall edge.

In an embodiment, the cardboard pull tab 113 and has a cut area 118 along at least one edge. The cut area 118 (also referred to as an open area or a separated area) may allow a user to slide a finger beneath the pull tab 113 and separate it from the container body 116. Alternatively, the cardboard pull tab 113 may have a small tab 301 (shown in FIG. 3) which is not affixed to the container wall and may be grasped to remove the pull tab 113 from the container wall to which it is perforatedly connected.

In an embodiment, the cardboard pull tab 113 is disposed in the front wall 102 of the container. In another embodiment, the cardboard pull tab 113 is disposed in the top wall 101 of the container. The cardboard pull tab 113 may be disposed in any wall or in any location within a wall.

Figure 4:
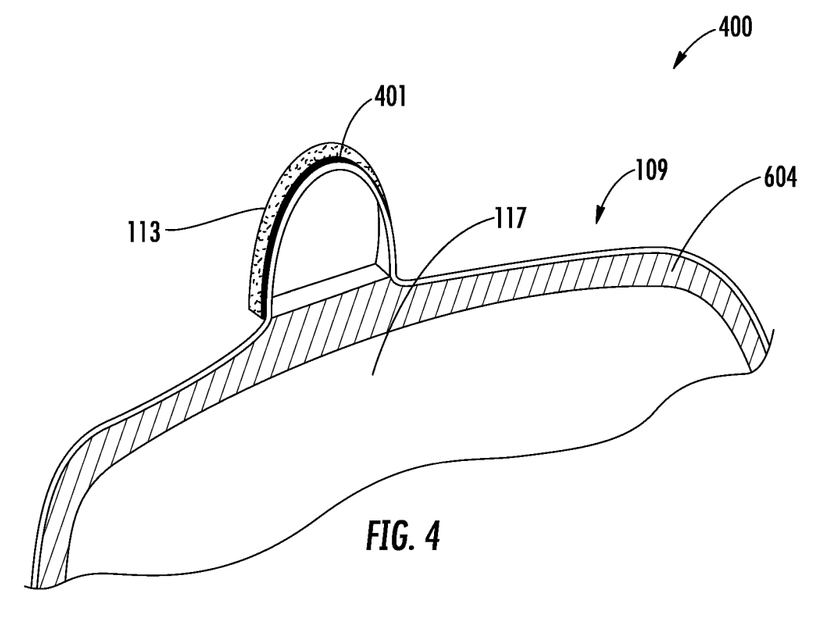
FIG. 4 is an exploded view of a tab of a container of the present invention.
Figure 5:
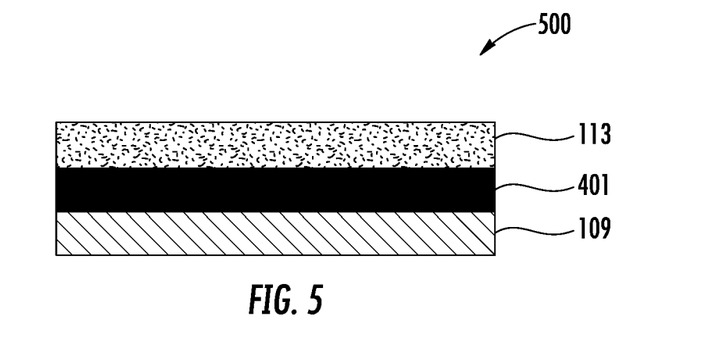
FIG. 5 is a cross sectional view of a tab of a container of the present invention.

In an embodiment, the cardboard pull tab 113 is adhered on its underside, via a permanent adhesive 401, to the top side of the film pull tab 111 (see FIG. 4). It should be understood that the permanent adhesive 401 may be applied to either or both of the cardboard layer 613 or the top film 109 during manufacture. In an embodiment, the entire cardboard layer 613 is permanently adhered, on its underside, to the top side of top film 109. In this embodiment, when the cardboard pull tab 113 is separated from the cardboard layer 613 by a user, it remains affixed to the film pull tab 111. The combined pull tab (cardboard/film) can then be pulled upward and/or backward, which separates the resealable flap 114 from the remainder of the laminate film 108 at the overcut 606.

Figure 7:
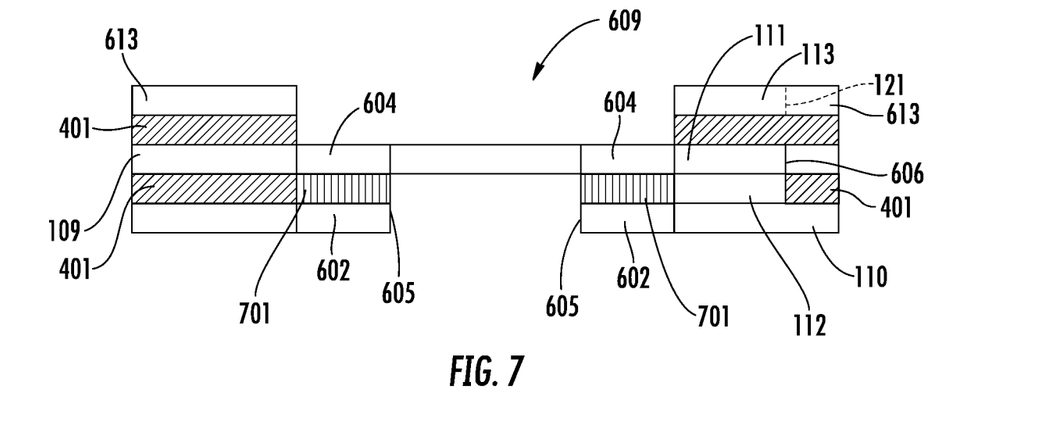
FIG. 7 is a cross sectional view of a tab portion of a container of the present invention.

FIG. 7 illustrates a cross-sectional embodiment of the pull tab 111, 113, top film 109, and bottom film 110. In this embodiment, the cardboard tab 113 is affixed to the film tab 111 via a permanent adhesive 401. The top film 109 is permanently affixed to the bottom film 110 in sections and is resealably affixed to the bottom film 110 in the PSA zones 602, 604 via a PSA 701.

In an embodiment, the cardboard pull tab 113 comprises a tamper evidence feature of the container. In this embodiment, the cardboard pull tab 113 may be continuous with one or more walls of the container, but includes an area of weakness created, for example, by a scored, perforated, or thinned line, or by forming the pull tab 113 out of a highly oriented material that has a tendency to split along a break line. Once the cardboard pull tab 113 is split or broken from the container body 116, it cannot be reaffixed to the container body 116. Once the cardboard pull tab 113 is split or broken from the container body 116 through the process of opening the container 100, in an embodiment, it may hang free of the container body 116, remaining affixed to the container 100 due only to its permanent adherence to the film pull tab 111. The hanging cardboard pull tab 113 provides a clear visual indication that the container 100 has already been opened.

In an embodiment, the container may comprise more than one cavity 115. In this embodiment, the cardboard layer 613 may define one or more cardboard openings 609. Additionally, in this embodiment, the container may utilize an adhesive-free zone as is set forth in U.S. patent application Ser. No. 15/442,779, filed Feb. 27, 2017, which is incorporated herein by reference in its entirety.

As noted above, in an embodiment, the cardboard layer 613 may comprise a label area 614, wherein company logos, photos, designs, and the like may be displayed. In another embodiment, a separate film label may be applied and permanently affixed to the outside of the cardboard layer 613 in the label area 614. Alternatively, a separate film label may be applied and permanently affixed to the outside of the cardboard layer 613 prior to cutting edge 610 and creating the cardboard opening 609. In this embodiment, the edge 610 may extend through both the cardboard layer 613 and any label layer.

Method of Making

The method of making the container blank can be generally described as follows and will be more fully described below:

1. Laminate the top and bottom film layers together to form a laminate;
2. Undercut and overcut the film laminate;
3. Cut the cardboard layer to form the container opening and perforate the cardboard pull tab; and
4. Adhere the film laminate to the underside of the cardboard layer.

Optionally steps 3 and 4, above, could be reversed.

Figure 8:
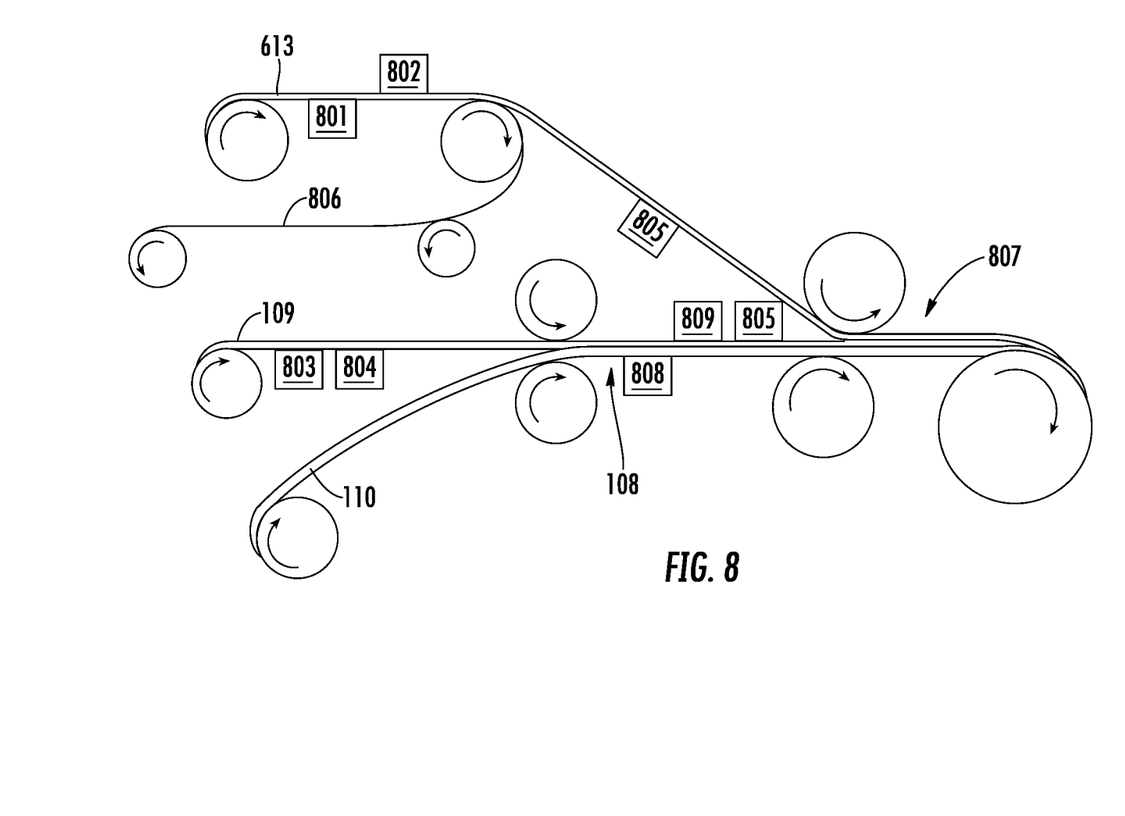
FIG. 8 is a diagram illustrating an embodiment of a method of making the containers of the invention.

Referring to FIG. 8, top film 109 and bottom film 110 may be provided in sheet form. PSA 803 and a permanent adhesive 804 may be (simultaneously or sequentially) pattern applied to the bottom surface of the top film 109 in predetermined areas. The adhesives may be applied in any suitable patterns but, in an embodiment, leaves at least one adhesive-free zone 112 at the location of the pull tab 111 and at least one adhesive-free zone in the location of the product viewing window 117. The adhesives may optionally be dried at a drying station such as an oven or the like.

Next, the top film 109 and bottom film 110 may be adhesively joined via the adhesives to form a laminated film 108. This may be accomplished using a laminating machine comprising two rollers forming a nip therebetween, or may be accomplished using any other method known in the art. In an embodiment, the top film 109 and bottom film 110 should be substantially coextensive with each other during the laminating process. For example, if the top film 109 and bottom film 110 are rectangular, the width and length of the top film 109 should match the width and length of the bottom film 110. The laminated film 108 may be rectangular or any shape suitable for use with the desired container.

The laminated film 108 is then fed to a first scoring station 808 where an undercut 605 may be scored in the bottom film 110. The undercut 605 may be formed with a laser, with a die cutting machine or by any suitable means and may extend through the entire thickness or almost the entire thickness of the bottom film 110. In an embodiment, the undercut 605 is in registration with the inside border between the PSA zone 604 pattern and the product viewing window 117 of the top film 109. Package integrity features may be cut into the bottom film 110 during this step well. In an embodiment, the undercut 605 may include a hinge such that upon opening the label, the resealable flap 114 will hinge between the die-cuts and remain adhered to the package. In an embodiment, the hinge may be an undercut "j-hook" hinge 615 or an overcut back hinge, but it should be understood that any mechanism which creates a stopping point that inhibits the complete removal of the flap 114 from the product package could be utilized.

The laminated film 108 may then be fed to a second scoring station 809 where an overcut 606 is formed in the outer facing surface of the top film 109, through the location of the cardboard opening 609. The overcut 606 is preferably formed substantially in registration with the outside border of the PSA zone 604 pattern, although it may overlap the PSA slightly. The overcut 606 may be formed with a laser, with a die cutting machine or by any suitable means and may extend through the entire thickness or almost the entire thickness of the top film 109.

It should be understood that the first and second scoring stations may apply overcuts or undercuts, in any order, and that a single scoring station could be utilized for both the undercut and overcut.

Cardboard layer 613 may also be provided in sheet form on a roller and may be die-cut or laser cut 801 to form at least cardboard edge 610, cardboard opening 609, and optionally, the cut area 118 of cardboard tab 113. The container wall shape(s) may also be cut such that the final cardboard layer 613 comprises a container blank that can be folded or otherwise assembled into a container. Simultaneously, before, or afterward, the cardboard layer 613 may be scored or perforated 802 in various regions around the cardboard tab 113, creating perforations 121 that permit the cardboard tab 113 to be removable from the relevant container wall(s). Again, the cutting and perforations made to the cardboard layer 613 may be accomplished in any order, at separate stations or at the same stations. The skeleton 806 of the cardboard layer 613, containing the cardboard opening 609, may be removed and discarded.

Next, a permanent adhesive may be pattern applied 805 to the top surface of the top film 109 in predetermined areas. The permanent adhesive should be applied such that leaves at least one adhesive-free zone in a location that will be registered with the cardboard opening 609 of the cardboard layer 613 once the cardboard layer 613 and the laminated film 108 are adhered. Alternatively, a permanent adhesive may be applied across the entire bottom surface of the cardboard layer 613, which already has been cut and the cardboard opening 609 removed. The permanent adhesive may optionally be dried at a drying station such as an oven or the like.

Next, the laminated film 108 and cardboard layer 613 may be adhesively joined via the permanent adhesive to form composite 807. This may be accomplished using two rollers forming a nip therebetween, and/or may be accomplished using any method known in the art, such as hot melt, heat seal, UV-activated seal, ultrasonic seal, energy-curable adhesive, or the like. In an embodiment, the laminated film 108 and cardboard layer 613 should be substantially coextensive with each other during the adhesion process. For example, if the laminated film 108 and cardboard layer 613 are rectangular, the width and length of the laminated film 108 should match the width and length of the cardboard layer 613. The laminated film 108 may be rectangular or any shape suitable for use with the desired container. The laminated film 108 and cardboard layer 613 should be registered such that the cardboard opening 609 of the cardboard layer 613, for example, is in registry with the outer edge of the PSA zone 604 of the top film 109. Similarly, the cardboard tab 113 of the cardboard layer 613 should be in registry with the adhesive-free zone 112 (which is adhesive-free between top film 109 and bottom film 110, but has a permanent adhesive between the top film 109 and the cardboard layer 613). Optionally, the composite material 807 may then be UV-cured or heat-sealed. The composite material may then be fed onto a roll for further use or the container blanks may be separated, stacked, and/or stored. Alternately, the container blanks may then be assembled into containers.

Method of Use

Figure 2:
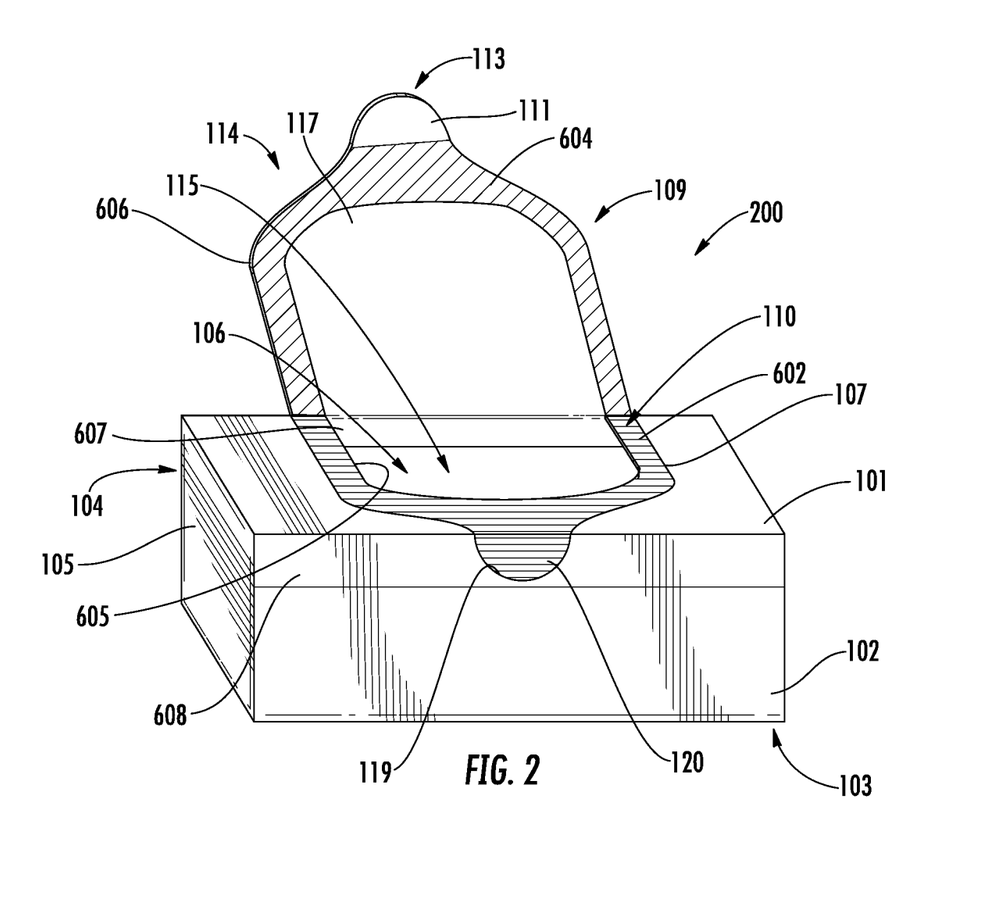
FIG. 2 is a perspective view of an embodiment of a container of the present invention in an open configuration.
Figure 3:
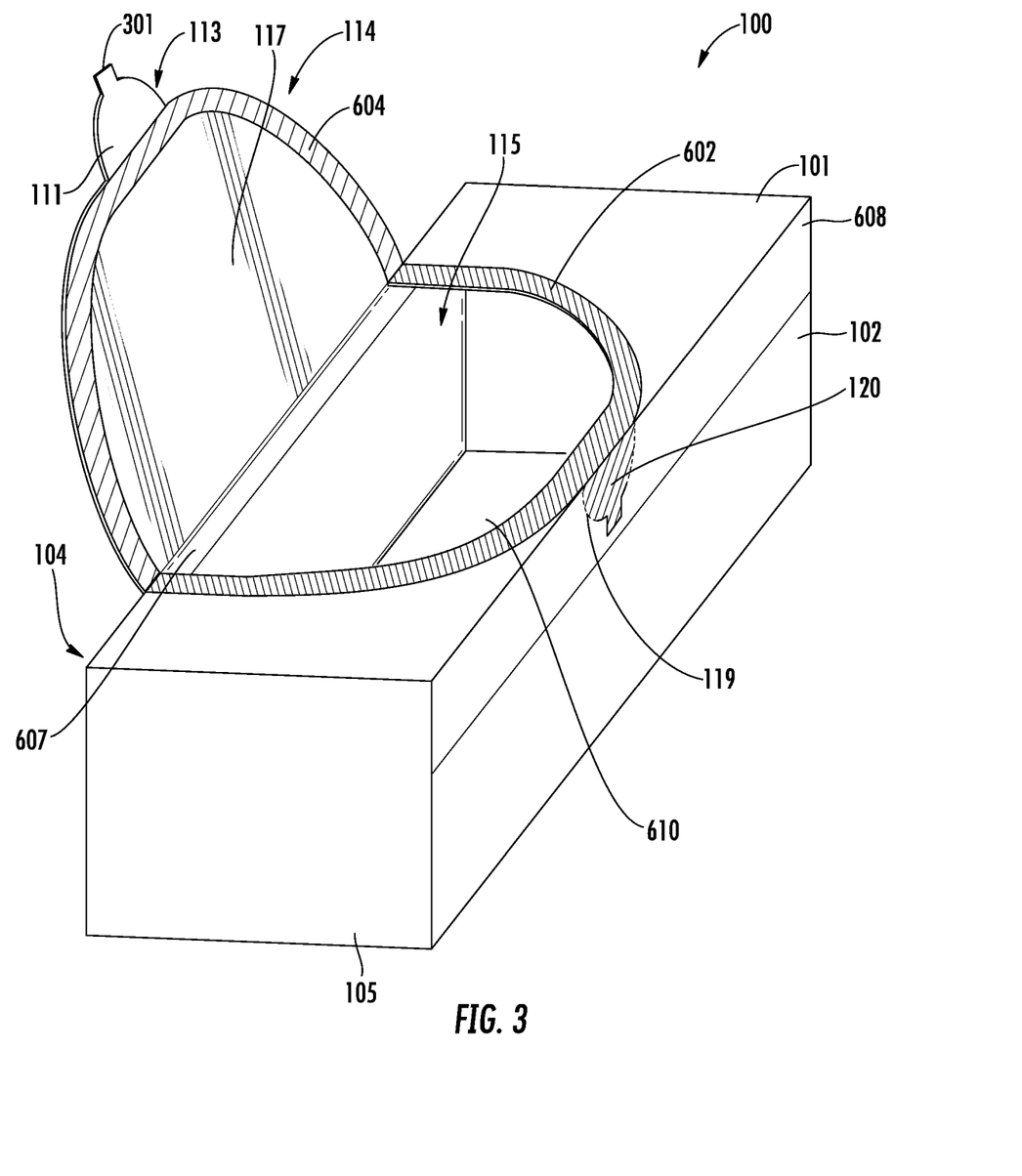
FIG. 3 is a perspective view of an embodiment of a container of the present invention in an open configuration.

The container 100 can be opened by separating the cardboard pull tab 113 from the front wall 102 (or other wall of which it may be continuous) of the container 100. More particularly, in an embodiment, the user can slide a finger beneath the cut portion 118 of the pull tab 113, or grasp the 301 tab, and break the perforations 121 along the sides of the pull tab 113. The pull tab may then be separated from the relevant wall of the container 100 and may hang freely. In an embodiment, the film pull tab 111, which is permanently adhered to the underside of the cardboard pull tab 113, is not adhered to the container 100 and the cardboard/film pull tab can be lifted away from the surface of the container 100. When lifted away from the surface of the container 100, FIGS. 2-3 illustrate the previous tab location 120. The previous tab location 120, in an embodiment, does not contain any adhesive, PSA or otherwise. Likewise, in an embodiment, the underside of the film pull tab 111 does not contain any adhesive, PSA or otherwise. In this embodiment, the pull tab 111, 113 hangs freely as soon as the cardboard pull tab 113 is separated from the relevant container wall by breaking the perforations.

In a separate embodiment, the previous tab location 120 and/or the underside of the film pull tab 111, contains PSA or another lightly adhering adhesive. In this embodiment, the film pull tab 111 must be lifted from the container wall to fully separate the cardboard/film pull tab from the container. In either embodiment, the separated cardboard/film pull tab provides a tamper evidence indicator—the user can visually see that the cardboard perforations are broken and, therefore, the container has been opened.

In use, as the user continues to pull, the resealable flap 114 releases from the bottom film 110 due to the limited adhesion of the PSA. More specifically, the top film 109 will separate or break along the overcut 606 as the pull tab 111, 113 is lifted, releasing the part of the resealable flap 114 which was adhered to the bottom film 110 via the PSA (i.e. the PSA zone 602, 604). This process opens at least one cavity 115 in the container 110, due in part to the presence of the undercut 605, through which the contents can be accessed. The peeling back of the resealable flap 114 serves to create the cavity 115 by removing a part of the film layer 108 as the top film 109 is removed or peeled back. Thus, the undercut 605 defines a location of the cavity 115 of the container 100 and is formed inwardly of the overcut 606 on the resealable flap 114. In FIGS. 2-3, the user has pulled back the resealable flap 114 to reveal the cavity 115 defined by the undercut 605.

The user may then remove the container contents, as desired, and may then reposition the resealable flap 114 back onto the bottom film 110. More particularly, the PSA zone 604 along the edge of the underside of the resealable flap 114 may be positioned directly on, and may seal completely to, the PSA area 602 on the upper surface of the bottom film 110. As the resealable flap 114 is placed in position and, optionally, pressed downward, the film layers releasably seal to one another. When the container 100 is reclosed via the resealable flap 114, in an embodiment, the pull tab 111, 113 remains unfixed and unsealed to the container, as a tamper evidence indicator.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged in whole or in part. Furthermore, those of ordinary skill in the art will appreciate that the foregoing description is by way of example only, and is not intended to limit the invention so further described in such appended claims. Therefore, the spirit and scope of the appended claims should not be limited to the description of the versions contained therein.

The invention claimed is:

1. A resealable container comprising a container body having a bottom wall, at least one upwardly extending sidewall, and a top wall, wherein at least one of the walls or sidewalls has a structure which comprises:

a bottom film layer;
a top film layer at least partially adhered on its lower surface to the upper surface of the bottom film layer, wherein:
the top film layer is scored to form at least one resealable flap and at least one pull tab continuous with the resealable flap, wherein the resealable flap is resealably adhered to the bottom film layer and the pull tab is not adhered to the bottom film layer; and
the bottom film layer comprises at least one cavity opening;
a cardboard layer adhered on its lower surface to the upper surface of the top film layer, wherein:
the cardboard layer has at least one cavity opening which is aligned with or larger than the scoring of the top film layer resealable flap;
the cardboard layer comprises at least one area of weakness which defines a tamper evidence feature, wherein the area of weakness is aligned with or larger than and adhered, on its underside, to the upper surface of the top film layer pull tab; and
when the at least one resealable flap is releasably sealed to the bottom film, the at least one resealable flap covers the bottom film cavity opening.

2. The resealable container of claim 1, wherein a pressure sensitive adhesive at least partially adheres the top film layer and the bottom film layer.

3. The resealable container of claim 2, wherein the pressure sensitive adhesive is pattern applied.

4. The resealable container of claim 1, wherein a permanent adhesive at least partially adheres the top film layer and the bottom film layer.

5. The resealable container of claim 4, wherein the permanent adhesive is pattern applied.

6. The resealable container of claim 1, wherein the underside of the pull tab is not adhered to the bottom film layer.

7. The resealable container of claim 1, wherein the container walls define an interior portion of the container and the bottom film layer cavity opening allows access to the container interior when the resealable flap is at least partially separated from the bottom film layer.

8. The resealable container of claim 1 comprising two resealable flaps and two bottom film layer cavity openings.

9. The resealable container of claim 1, wherein the top film layer is hermetically sealed to the container.

10. The resealable container of claim 1, wherein the at least one resealable flap is transparent.

11. The resealable container of claim 1, wherein the at least one tamper evidence feature is continuous with the at least one cardboard cavity opening.

12. The resealable container of claim 1, wherein the at least one area of weakness is adjacent the at least one cardboard cavity opening.

13. The resealable container of claim 1, wherein the at least one tamper evidence feature is configured to separate the from the container wall along the area of weakness.

14. The resealable container of claim 1, wherein the at least one tamper evidence feature comprises a tab which can be used to separate the tamper evidence feature from the container wall.

15. The resealable container of claim 1, wherein once the at least one tamper evidence feature is separated from the container wall, it cannot be reaffixed to the container wall.

16. The resealable container of claim 1, wherein the area of weakness comprises a scored line.

17. The resealable container of claim 1, wherein the area of weakness comprises a perforated line.

18. The resealable container of claim 1, wherein the area of weakness comprises a thinned line.

19. The resealable container of claim 1, wherein the cardboard layer is highly oriented and the area of weakness comprises a break line.

\* \* \* \* \*